Patented Sept. 13, 1932

1,876,543

UNITED STATES PATENT OFFICE

VINCENT G. APPLE, OF DAYTON, OHIO, AND HENRY D. HUKILL, OF SOUTH BEND, INDIANA, ASSIGNORS TO BENDIX BRAKE COMPANY, OF SOUTH BEND, INDIANA, A CORPORATION OF ILLINOIS

ELECTRIC CONTROL MECHANISM

Application filed February 24, 1930. Serial No. 430,686.

Our invention relates to control mechanism, and particularly to electric control mechanism, for devices, such as the starting motor and brake operating mechanism, provided on automotive vehicles.

One object of our invention is to provide control means for an electric circuit, which includes an electric motor carried by a motor vehicle and coupled with two separate devices on the vehicle, to operate said devices. The control means permits the coupling of the motor with one of said devices to drive the same at will, and permits the coupling of the motor with the other device to drive it but only in response to the necessary demand of said device in its functioning.

In the illustrated embodiment of our invention the electric motor being controlled is the electric starting motor carried with the vehicle and operable to start the engine of the vehicle and which is here shown as coupled through mechanism, such as brake operating mechanism, to apply the brakes. Our improved control means operates to permit the motor circuit to be closed at will through the motor to start the engine and permits the circuit to be closed to operate the other mechanism which functions to furnish power to apply the brakes only in response to determined power requirements thereof.

In order to provide power to operate the brakes when desired we provide a source of constant power supply, which is available at all times for the purpose of operating the brakes and we provide automatic control means responsive to the predetermined supply of power desired controlling the operation of the motor to maintain said source of power at its predetermined standard.

A further meritorious feature is the provision of additional control means in the form of mechanism operable only when an occupant is seated in the vehicle to permit the coupling of the motor with the means to maintain the desired constant quantity of power.

More particularly we provide, in an electric circuit including the starting motor, a switch operable at will which controls the functioning of the motor to start the engine, and a switch controlled by a maintained source of power which is automatically responsive only to a predetermined minimum of maintained power to permit the functioning of the motor to replenish said source of power. A third switch is provided which is controlled by the position of a seat in the vehicle for an occupant, which position is determined by the presence or absence of an occupant, which regulates functioning of the motor to replenish said source of maintained power.

A further object is to provide an electric circuit which includes an electric motor, capable on rotation in one direction to start the engine of a motor vehicle and on rotation in the other direction to drive a fluid compressor and having a switch which controls the circuit in the engine starting direction and is operable at all times, and a vehicle switch which controls rotation in the compressor driving direction and is operable only when a third switch is closed, and particularly only when a seat of the vehicle is occupied.

Other objects and meritorious features of our invention will more fully appear from the following description taken in conjunction with the drawings wherein.

Figure 1:
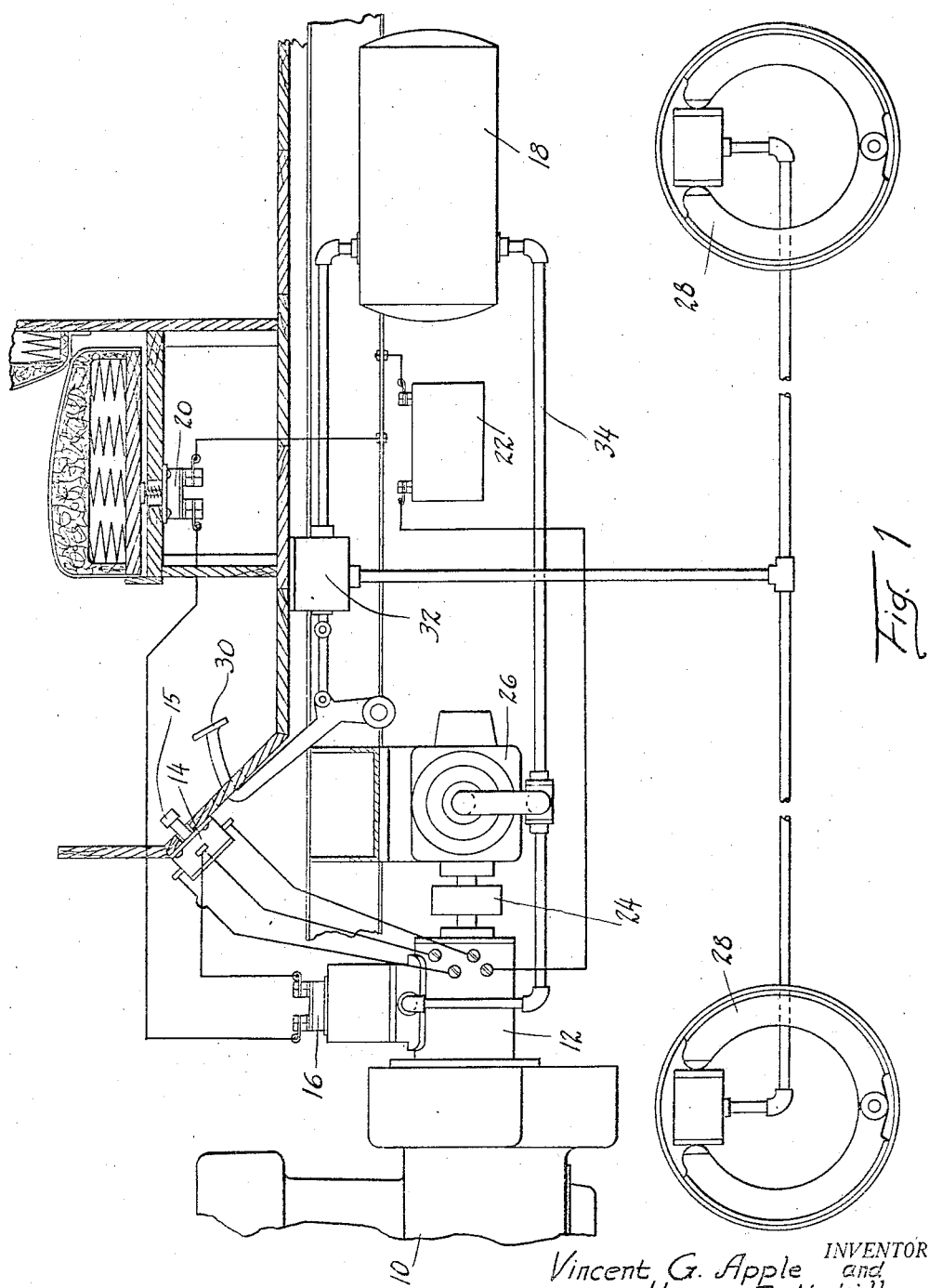
Fig. 1 is a somewhat diagrammatic disclosure of our apparatus.
Figure 2:
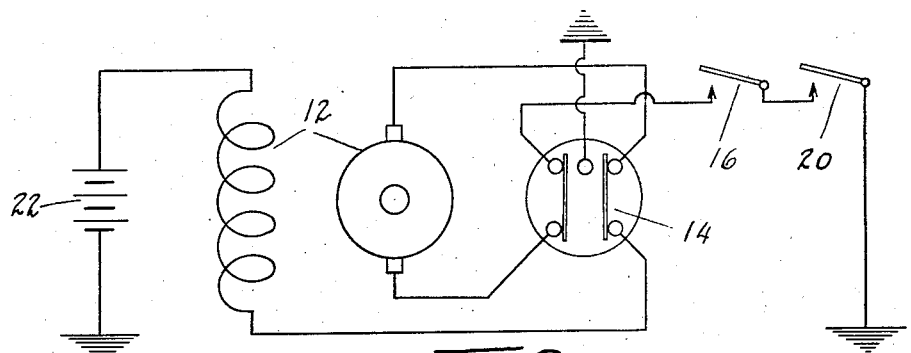
Fig. 2 is a diagram of the electric circuit when the vehicle is not in use, the driver's seat being unoccupied.
Figure 3:
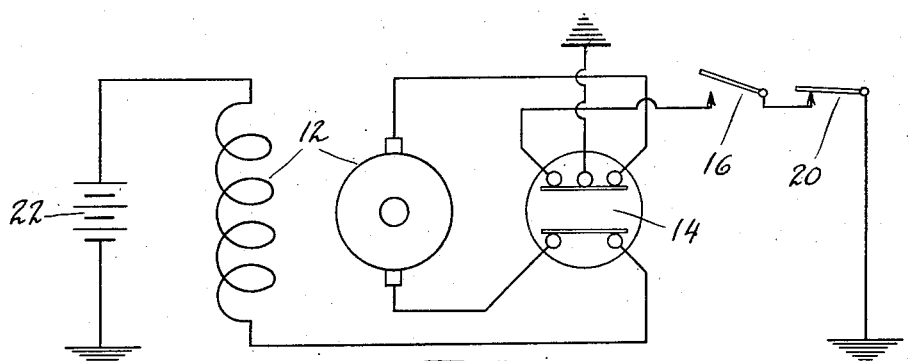
Fig. 3 is a diagram of the electric circuit when the driver occupies the seat and presses on the starter switch to start the engine.
Figure 4:
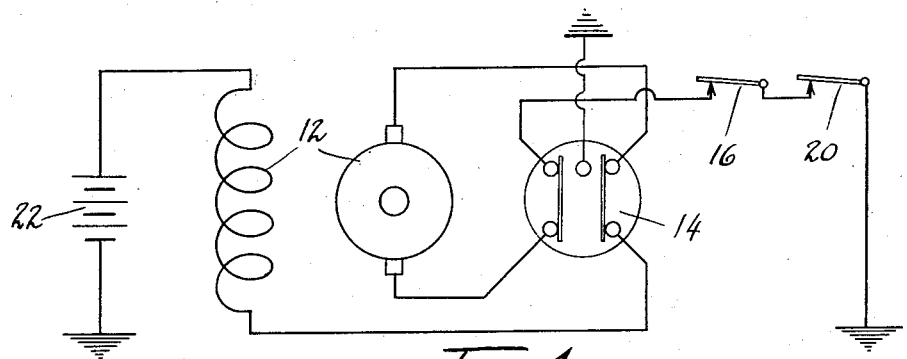
Fig. 4 is a diagram of the electric circuit when the starter switch is released and the pressure switch is closed.

In the diagrammatic view of Fig. 1 the numeral 10 indicates a conventional internal combustion engine which is disconnectedly coupled with an electric starting motor 12 in the usual fashion. The motor 12 is reversible and, when operating in a direction opposite to that in which it cranks the engine 10, it functions to drive an air compressor 26. A four pole double throw starter switch 14 is electrically connected to the starter motor so that depression of stem 15 closes an electric circuit through the said motor from the storage battery 22.

By way of illustration we have shown diagrammatically a system of fluid pressure brakes, broadly indicated by the numeral 28, power for which is provided by a pressure tank 18. The brake pedal 30 is linked up with valve mechanism 32 to regulate the flow of fluid pressure to the brakes.

These brakes require a certain predetermined minimum pressure for their proper operation and we have provided means for maintaining this predetermined minimum pressure in the pressure tank 18. A pressure control electric switch 16, described and claimed in detail in our copending application Serial Number 422,747, filed January 23, 1930, is provided with two binding posts, one of which connects up to one terminal of a seat switch 20, the other of which is connected up to starter switch 14. The other terminal of the seat switch 20 is grounded conveniently on the automobile frame.

When the pressure in the pressure tank 18 falls below the aforesaid predetermined minimum this reduction in pressure is transmitted through the pipe 34 to switch 16 causing the switch to close a circuit through the electric motor 12 which causes rotation thereof in the proper direction for actuating our compressor 26. The drive connection between the electric motor 12 and the compressor 26 includes a one way clutch member 24 in order that rotation of motor 12 in the engine cranking direction will be unimpeded.

It is to be noted that, inasmuch as pressure switch 16 and seat switch 20 are in the same circuit, the circuit cannot be closed automatically by reduction of pressure in tank 18 unless the switch 20 is closed. This switch is so designed that the weight of an ordinary person sitting in the seat is sufficient to depress a conventional switch stem and so bridge the switch contacts.

On the other hand, it is to be noted that on depression of the pedal stem 15 of starter switch 14 the circuit is closed for rotating electric motor 12 in engine cranking direction. This circuit may be closed in this way at any time, regardless of the positions of switches 20 and 16.

Thus it will be seen that we have provided a control apparatus for an automobile wherein a predetermined minimum pressure is automatically maintained whenever the seat is occupied and the automobile is in use for operating fluid pressure brakes, while at the same time permitting utilization of the same power source as is used to maintain this pressure to crank the engine at any time.

Various modifications will be apparent to those skilled in the art and for that reason we intend to limit ourselves only within the scope of the appended claims.

We claim:

1. Automotive vehicle control mechanism comprising, in combination, an electric circuit including a switch adapted to close upon occupancy of the driver's seat, brakes, a fluid compressor, an engine, an electric motor operable on rotation in one direction to drive said engine and on rotation in the other direction to drive said compressor, a pressure controlled switch in said circuit operable to close a circuit through the motor in a compressor drive direction only when the driver's seat is occupied, and a reversing switch operable at any time to close a circuit through the motor in an engine drive direction.

2. Control mechanism for a vehicle having an engine and a fluid pressure brake system including a fluid pump comprising in combination an electric circuit having a reversible electric motor operable in one direction of rotation to actuate the engine and in the other the pump, a control switch, pressure controlled means for closing the electric circuit in one direction through said motor only when the control switch is closed, and a switch for closing a reverse circuit through said motor regardless of the position of the control switch.

3. Vehicle control mechanism including in combination with a seat for an occupant, brakes, an engine, a fluid pressure tank coupled with the brakes to apply the brakes, and means operable at will to drive the engine, said means being operable to maintain a determined pressure in said pressure tank only when said seat is occupied.

4. Vehicle control mechanism comprising an electric circuit including a reversible electric motor operable in one direction of rotation to start an engine and in the other to drive an air compressor, a reversing starter switch, a depressible seat including a switch adapted to be closed on depression of said seat and a pressure controlled switch connected in series with said starting seat switch.

5. In a vehicle having, in combination, an engine, brakes, a source of power to apply the brakes, a starting motor operable to start the engine or to maintain a reserve of power in said source of power, and means controlling the starting motor operable at any time to cause the motor to start the engine and operable to cause the motor to maintain a reserve of power in said source of power only when the reserve of power therein falls below a predetermined minimum.

6. In a vehicle having, in combination, a seat, a reversible electric motor, mechanisms adapted to be driven by the motor in each direction of its rotation, and an electric circuit including said motor and provided with control switches, one of said switches being manually operable at will to close the circuit in one direction and another of said switches being operable only when the seat is occupied to close the circuit in the reverse direction.

In testimony whereof, we, VINCENT G. APPLE, and HENRY D. HUKILL, sign this specification.

VINCENT G. APPLE.
HENRY D. HUKILL.